(12) United States Patent
Miyamori

(10) Patent No.: US 7,587,813 B2
(45) Date of Patent: Sep. 15, 2009

(54) ASSEMBLY DEVICE FOR OPTICAL DISK

(75) Inventor: Kenichi Miyamori, Toyonaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/907,499

(22) Filed: Oct. 12, 2007

(65) Prior Publication Data
US 2008/0046901 A1 Feb. 21, 2008

Related U.S. Application Data

(62) Division of application No. 10/284,480, filed on Oct. 31, 2002, now abandoned.

(30) Foreign Application Priority Data

Nov. 1, 2001 (JP) ............................. 2001-336322

(51) Int. Cl.
B23P 19/00 (2006.01)
(52) U.S. Cl. .................. 29/738; 29/732; 29/281.5; 360/99.08; 369/44.32
(58) Field of Classification Search ........... 29/759–760, 29/732–736, 603.1, 603.3–603.09, 281.5, 29/251, 252; 360/98.07, 99.08; 369/258, 369/270, 271, 44.32
See application file for complete search history.

(56) References Cited

U.S. PATENT DOCUMENTS

| 4,509,251 | A | * | 4/1985 | Gyi et al. ................ 29/603.06 |
| 5,495,660 | A | * | 3/1996 | Choi ........................... 29/732 |
| 5,546,271 | A | * | 8/1996 | Gut et al. ..................... 361/680 |
| 5,758,408 | A | * | 6/1998 | Choi ........................... 29/732 |
| 5,796,707 | A | | 8/1998 | Kim |
| 5,867,471 | A | | 2/1999 | Kim et al. |
| 6,005,836 | A | | 12/1999 | Choi |
| 6,158,112 | A | * | 12/2000 | Kim et al. .................... 29/759 |
| 6,181,669 | B1 | | 1/2001 | Park |
| 6,236,636 | B1 | | 5/2001 | Ogusu |
| 6,324,152 | B1 | | 11/2001 | Eguchi et al. |
| 6,651,311 | B1 | * | 11/2003 | Kim et al. ................ 29/603.03 |
| 6,691,391 | B2 | * | 2/2004 | Lin .......................... 29/281.5 |
| 6,792,614 | B1 | | 9/2004 | Matsumura et al. |
| 6,952,868 | B2 | * | 10/2005 | Fahley et al. ................... 29/732 |

* cited by examiner

Primary Examiner—Minh Trinh
(74) Attorney, Agent, or Firm—Steptoe & Johnson LLP

(57) ABSTRACT

An assembly device assembles a recording and reproducing device for an optical disc by bonding spindle motor to a mechanical chassis. The assembly device adjusts the attitude of the spindle motor relative to the mechanical chassis prior to bonding by adjusting an inclination of the spindle motor about a first axis and about a second axis perpendicular to the first axis. The assembly device also adjusts a height of the spindle motor.

5 Claims, 8 Drawing Sheets

ASSEMBLY DEVICE FOR OPTICAL DISK

REFERENCE TO RELATED APPLICATIONS

This application is a divisional of application Ser. No. 10/284,480 filed Oct. 31, 2002, now abandoned, which claims the benefit of Japanese Patent Application No. 2001-336322 filed Nov. 1, 2001.

FIELD OF THE INVENTION

The present invention relates to a recording and reproducing device for an optical disc and particularly concerns a recording and reproducing device for an optical disc such as a CD (Compact Disc), MD (Mini Disc), and DVD (Digital Video Disc or Digital Versatile Disc).

BACKGROUND OF THE INVENTION

In a recording and reproducing device for an optical disc, in order to record information on the optical disc or reproduce information from the optical disc, the optical axis of an optical pickup needs to be precisely perpendicular to a recording surface of the optical disc. In recent years, higher accuracy of perpendicularity has been demanded because of improvement in recording density.

In order to achieve higher accuracy, the rotation axis of a spindle motor in a recording and reproducing device for an optical disc and the optical axis of the optical pickup need to be placed in parallel with each other. However, due to a manufacturing error of a mechanical chassis of an optical disc recording and reproducing device, an assembling error of the device, and so on, the rotation axis of the spindle motor and the optical axis of the optical pickup may not be in parallel with each other. Furthermore, a turntable surface of the spindle motor and a direction of transfer of the optical pickup may not be in parallel with each other.

In order to correct such displacement, according to a publicly known technique, a mechanical chassis includes a mechanism for inclining a spindle motor to a mechanical chassis so as to adjust a parallelism between the rotation axis of a spindle motor and the optical axis of an optical pickup and a parallelism between a turntable surface of the spindle motor and a direction of transfer of the optical pickup. This mechanism adjusts a tilt angle of the spindle motor after completion of assembling.

Further, another adjusting method has been known in which guide shafts for moving an optical pickup to a radial direction of an optical disc are tilted so as to adjust a parallelism between the rotation axis of a spindle motor and the optical axis of an optical pickup and a parallelism between a turntable surface of the spindle motor and a direction of transfer of the optical pickup in a recording and reproducing device for an optical disc.

As a first publicly known technique for adjusting a tilt angle of a spindle motor, a technique has been known that the end of a base plate having a spindle motor is pressed to a tilted base in a mechanical chassis. Two or more screws are screwed into the mechanical chassis through a base plate, springs are attached to the screws externally, and the end of the base plate is pressed to the tilted base by pushing force of the screws, the pushing force being generated by compression of the screws between the heads of the screws and the base plate. In this state, an eccentric cam in contact with the base plate is operated, so that the end of the base plate is moved along the tilted part of the base, thereby adjusting a tilt angle of the spindle motor.

A second publicly known technique for adjusting a tilt angle of the spindle motor is disclosed in JP-A-8-17135 and JP-A-9-223353. In this technique, the base plate mounted with a spindle motor is attached to the mechanical chassis in a state being supported at three points. At one of the three points, a spacer is sandwiched between the mechanical chassis and the base plate so that the one of the three points works as a fulcrum to the mechanical chassis. At the other two points, the base plate is connected to the mechanical chassis by means of a screw with a spring being sandwiched between the base plate and the mechanical chassis. Therefore, the angle of inclination of the base plate is adjusted according to a screwing amount of the screw.

A publicly known technique for adjusting a parallelism by inclining guide shafts has been available as follows: a pair of guide shafts is provided, and the guide shafts are supported on a supporting point near the inner circumferential side of a disc and are movably placed in a vertical direction near the outer circumferential side. On this freely movable part, springs are provided between the guide shafts and the chassis, and the tip of an adjust screw is brought into contact with the guide shafts in such a manner as to resist the force of the springs. When the adjust screw is rotated, the adjust screw is moved relative to the mechanical chassis, and the guide shafts pressed to the adjust screw by the springs are thus moved slightly in the perpendicular direction of the mechanical chassis on the outer circumferential side with the disc inner circumferential side serving as a supporting point. Consequently, adjustment is made in such a way that the rotation axis of the spindle motor and the optical axis of an optical pickup are placed in parallel with each other.

However, adjustment cannot be readily made in any of the above-described publicly known techniques. Further, since adjustment is made based on the feed of the screws with combination of screws and springs, it is necessary to secure a size of a length of the screw, resulting in a large thickness of the device.

DISCLOSURE OF THE INVENTION

In view of the above-described technical problem of the publicly known techniques, the present invention has as its objective the provision of a thinner device at low cost by devising a structure for attaching a spindle motor to a mechanical chassis in a recording and reproducing device for an optical disc.

In order to attain the above-described objective, a recording and reproducing device for an optical disc of the present invention comprises a spindle motor for rotating an optical disc, a mechanical chassis for fixing the spindle motor, a fixing member provided on the spindle motor, and bonding means for fixing the spindle motor to the mechanical chassis by bonding the fixing member to the mechanical chassis in a state in which attitude adjustment and positioning are performed.

With this configuration, since the spindle motor is fixed to the mechanical chassis by causing the bonding means to bond the fixing member to the mechanical chassis in a state in which attitude adjustment and positioning are performed, unlike the publicly known techniques in which screws and springs are combined to make adjustment according to the feed of the screws, it is not necessary to secure a size of a length of the screw, thereby reducing a thickness of the recording and reproducing device for an optical disc at lower cost.

According to the present invention, a device for assembling the recording and reproducing device for an optical disc is provided on the outside of the recording and reproducing device and comprises means for adjusting inclination of the spindle motor in the track width direction, means for adjusting inclination of the spindle motor in the track tangent direction, and means for adjusting a height of the spindle motor relative to the optical pickup.

With this configuration, adjustment can be readily performed because the adjustment is made by an external device, and the external device does not need to be mounted in the recording and reproducing device for an optical disc, thereby reducing a thickness of the recording and reproducing device at lower cost.

It is advantageous for the assembling device to have means for adjusting the position of the spindle motor in the surface direction of an optical disc.

DESCRIPTION OF THE EMBODIMENT(S)

Figure 1:
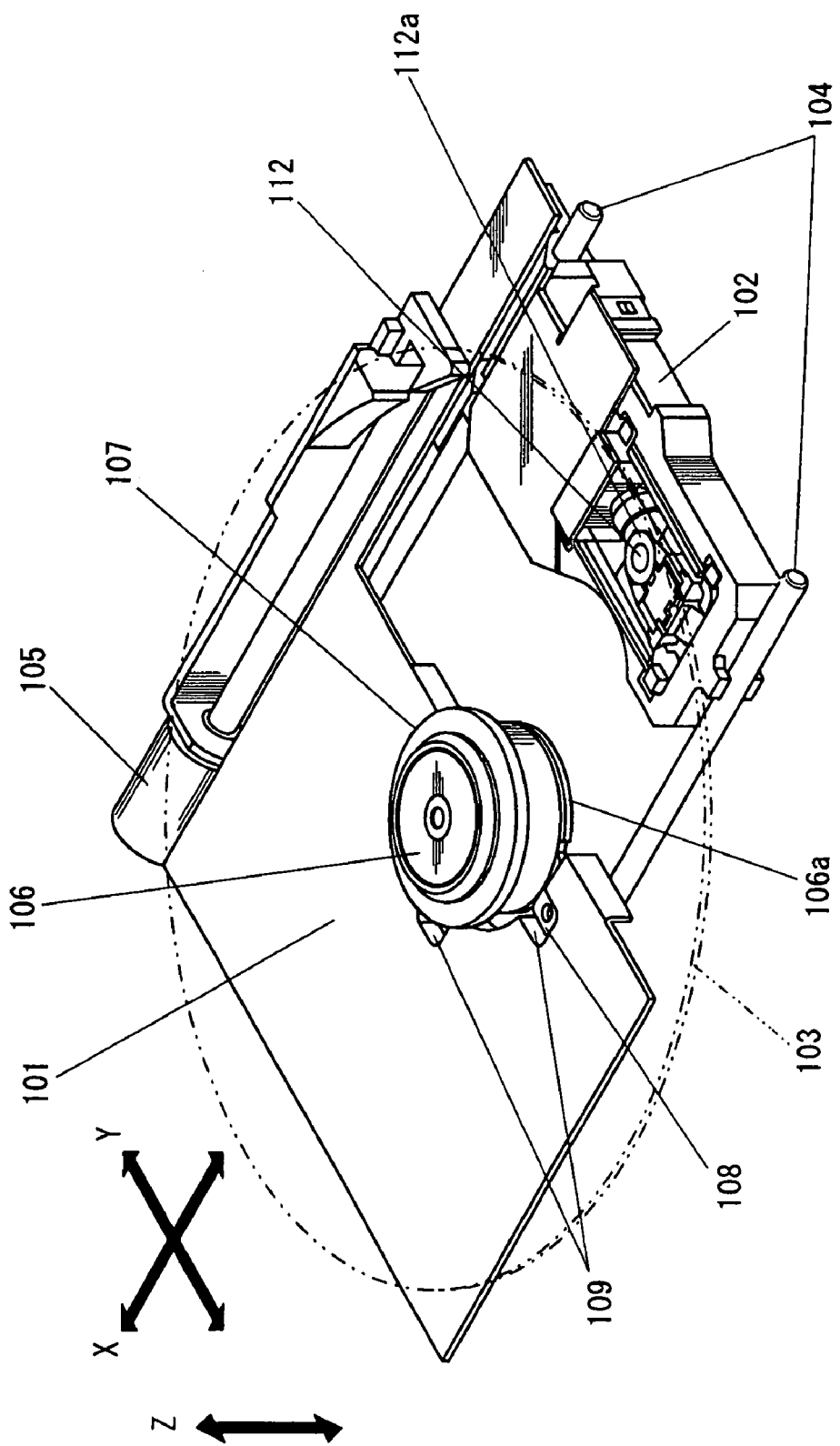
FIG. 1 is a perspective view showing an embodiment of a recording and reproducing device for an optical disc of the present invention.
Figure 2:
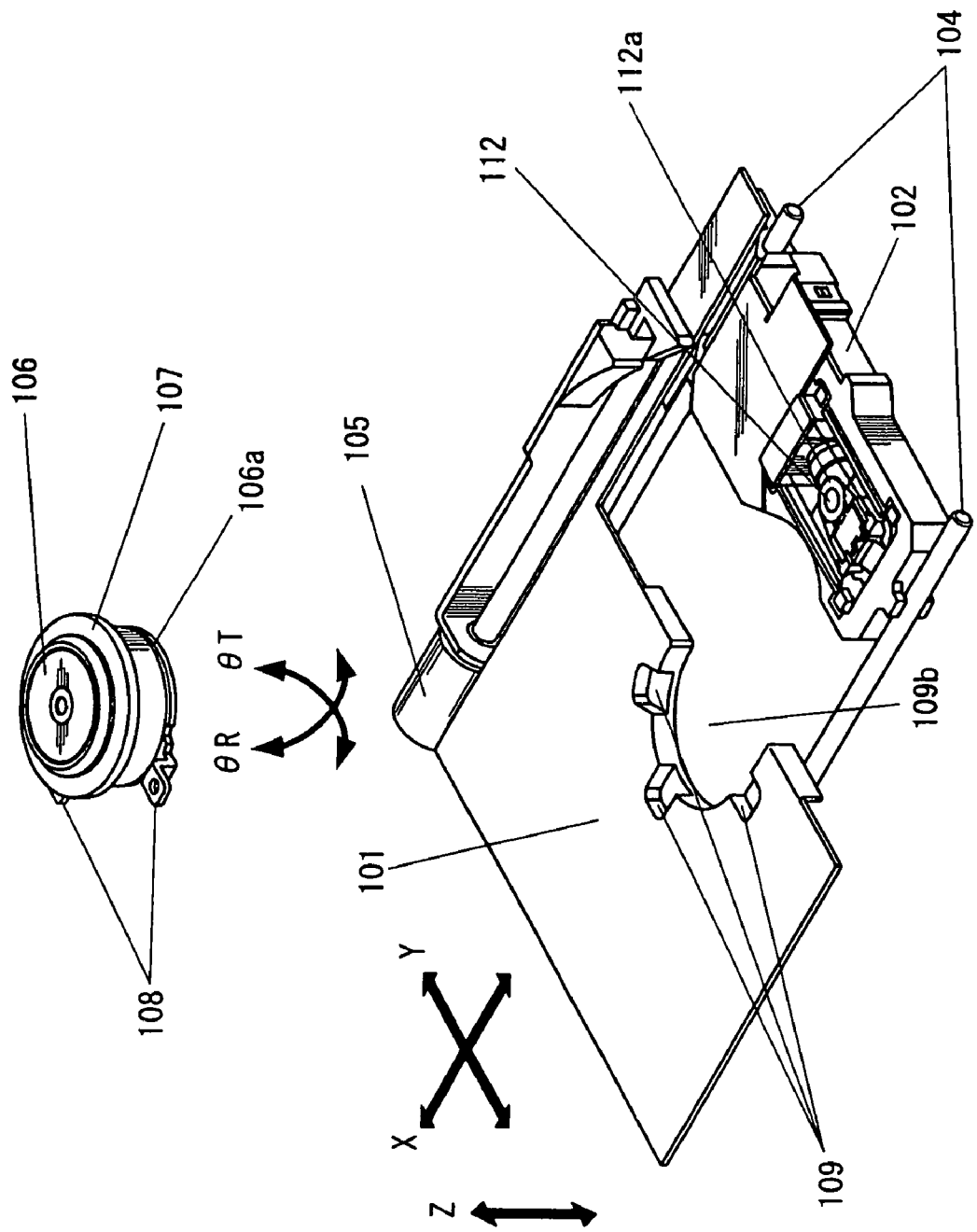
FIG. 2 is an exploded perspective view showing the recording and reproducing device of FIG. 1.
Figure 3:
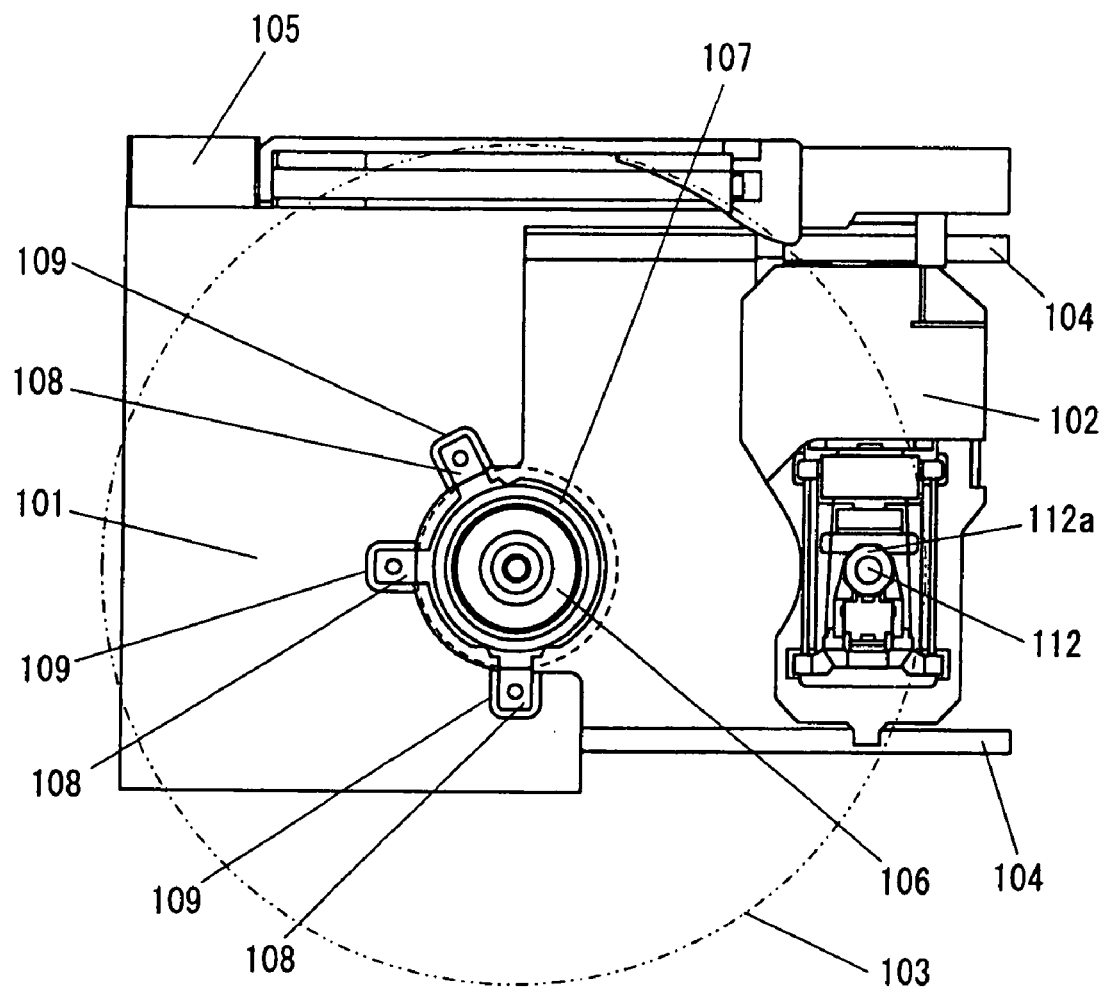
FIG. 3 is a plan view showing the recording and reproducing device shown in FIGS. 1 and 2.

In a device shown in FIG. 1, FIG. 2, and FIG. 3, a mechanical chassis 101 comprises two guide shafts 104 serving as guides for moving an optical pickup 102 in the radius direction, that is, a track width direction of an optical disc 103, and a traverse motor 105 serving as a driving source for moving the optical pickup 102 in the track width direction of the optical disc 103. As the traverse motor 105 rotates, the optical pickup 102 is transferred in the track width direction according to the guide shafts 104 while maintaining a prescribed distance from a disc surface of the optical disc 103. An objective lens 112 is provided on the optical pickup 102. Reference numeral 112a denotes a lens frame of the objective lens 112 and is formed as a flat surface with accuracy.

A turntable 107 for placing the optical disc 103 thereon is provided on a spindle motor 106 for rotating the optical disc 103 at a prescribed rotational frequency.

On a motor base 106a of the spindle motor 106, a plurality of protrusions 108 are provided along the circumferential direction. The protrusions 108 protrude in the diameter direction from the motor base 106a to attach the spindle motor 106 to the mechanical chassis 101. A round notch 109b for storing the spindle motor 106 is formed on the mechanical chassis 101, and a plurality of recessed steps 109 is provided on the circumferential wall of the mechanical chassis 101 where the notch 109b is formed. The recessed steps 109 permit the protrusions 108 to be freely fit when the spindle motor 106 is stored in the notch 109b.

Figure 4:
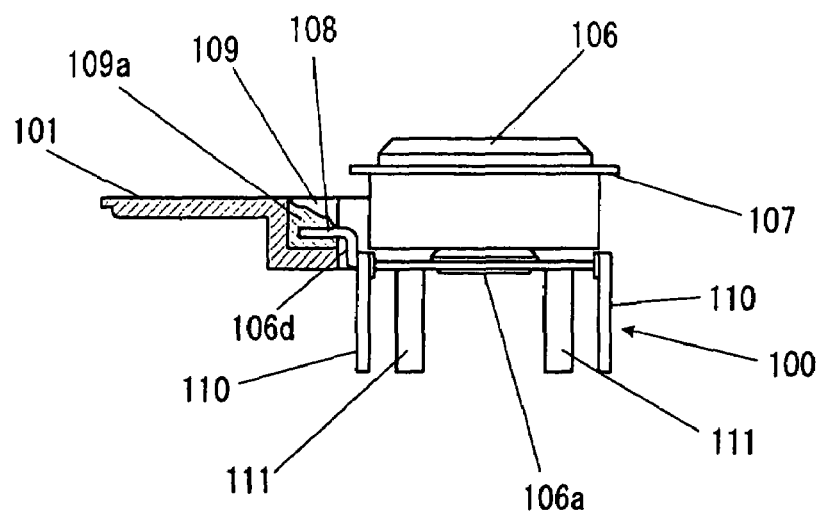
FIG. 4 is a sectional view showing a structure of how to attach a spindle motor in the recording and reproducing device in FIGS. 1 to 3.
Figure 5:
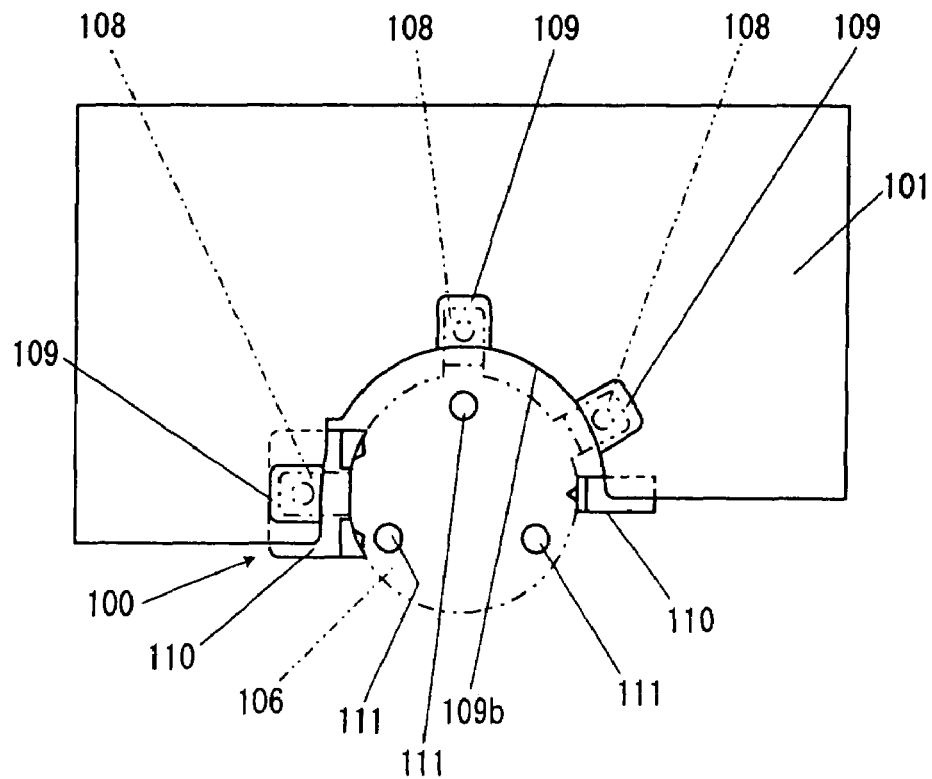
FIG. 5 is a plan view showing a part of FIG. 4.

As shown in FIGS. 4 and 5, the spindle motor 106 is positioned relative to the mechanical chassis 101 while being held by an external adjusting device 100. After adjustment of a tilt angle and a parallelism relative to the optical pickup, the spindle motor 106 is fixed on the mechanical chassis 101. The spindle motor 106 is placed on the upper ends of a plurality of height determining pins 111 provided on the external adjusting device 100, so that the spindle motor 106 is supported by the height determining pins 111 while being positioned in the height direction, that is, the thickness direction of the device. The external adjusting device 100 has a plurality of open/close chucking pins 110 in the circumferential direction. The craws on the tips of the chucking pins 110 can chuck the base 106a of the spindle motor 106. In the spindle motor 106 of FIGS. 4 and 5, the protrusions 108 are formed by bending, so that the protrusions 108 have guards 106d which are integrally formed in parallel with the shaft center of the spindle motor 106. The guards 106d are provided outside the chucking pins 110 in the diameter direction of the spindle motor 106 when the chucking pins 110 chuck the base 106a of the spindle motor 106.

The spindle motor 106 is positioned in the notch 109b of the mechanical chassis 101 while being held by the external adjusting device 100. At this moment, the leading ends of the protrusions 108 from the guards 106d are freely fit into the recessed steps 109. In this state, a tilt angle of the spindle motor 106 and the parallelism relative to the optical pickup are adjusted by adjusting the attitude and position of the external adjusting device 100 as required. Then, adhesive 109a made of an ultraviolet curing resin is filled in the recessed steps 109. Thereafter, the adhesive 109a is cured by radiating ultraviolet rays and thus the protrusions 108 are fixed to the recessed steps 109. In this way, the spindle motor 106 is attached to the mechanical chassis 101 with a required attitude. The external adjusting device 100 is removed at proper time.

With this configuration, the spindle motor 106 is held by the external adjusting device 100 provided outside a recording and reproducing device, a tilt angle of the spindle motor 106 is adjusted in this holding state, a parallelism between the spindle motor 106 and the optical pickup 102 is adjusted, and then, the spindle motor 106 is attached to the mechanical chassis 101. Thus, the recording and reproducing device does not need a mechanism for adjusting the inclination and height of the spindle motor 106. For this reason, it is possible to provide an inexpensive configuration of the recording and reproducing device for an optical disc and to reduce a thickness of the recording and reproducing device for an optical disc.

Also, the resin adhesive is used for attaching the spindle motor 106 to the mechanical chassis 101, so that it is possible to reduce vibration caused by the rotation of the spindle motor 106. Thus, low noise can be achieved. In addition, since it is possible to reduce vibration of the spindle motor 106 that propagates via the guide shafts 104, noise components of a signal obtained from the optical pickup 102 can be reduced. Furthermore, it is possible to suppress defocus of the optical pickup 102 that is caused by vibration of the rotation of the spindle motor 106. Moreover, current for focusing can be reduced accordingly, achieving lower power consumption.

The following will discuss the detail of a mechanism for adjusting the spindle motor 106, which is attached to the mechanical chassis.101, to the prescribed attitude.

Figure 6:
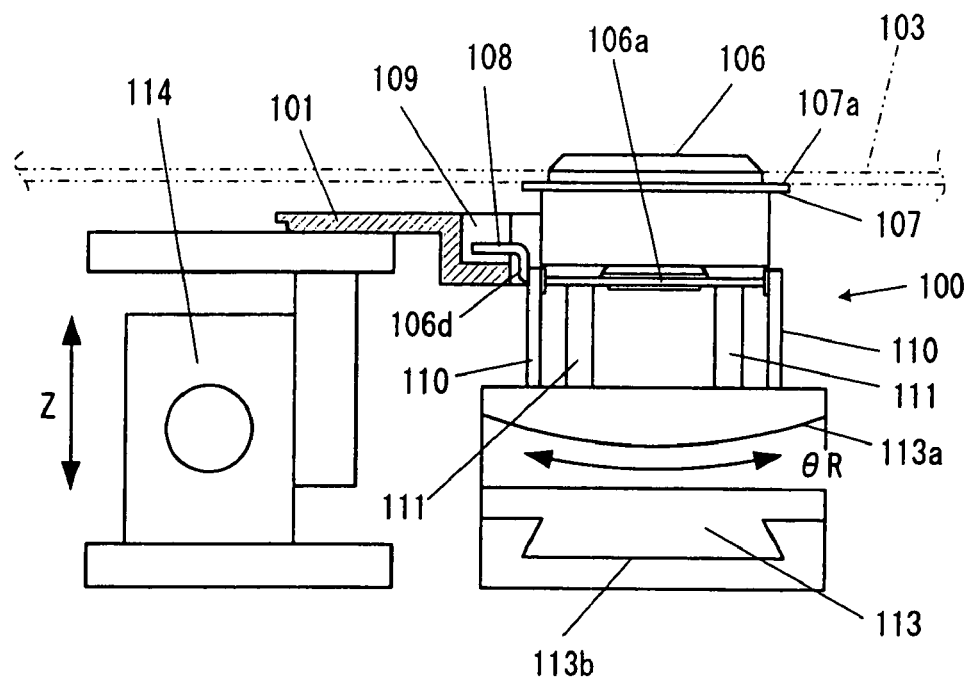
FIG. 6 is a view showing a main configuration of an assembling device according to the present invention.

As shown in FIG. 6, the external adjusting device 100 for holding the spindle motor 106 is attached to an inclination adjusting mechanism 113. The inclination adjusting mechanism 113 can incline the external adjusting device 100 at an angle θR in the track width direction and an angle θT in the track tangent direction of the optical disc 103 while using as a center a point where an ideal center line position of the optical disc 103 intersects an ideal focal position (height surface) of the objective lens 112 mounted on the optical pickup 102. Reference numeral 113a denotes a columnar guide surface for inclining the external adjusting device 100 by an angle θR in the track width direction of the optical disc 103 with the above intersection serving as the center. The columnar guide surface 113a is formed into a column around a center axis passing through the intersection, that is, a center axis perpendicular to the surface shown in FIG. 6. Further, reference numeral 113b denotes a columnar guide surface for inclining the external adjusting device 100 by an angle θT in the track tangent direction of the optical disc 103 with the above intersection serving as the center. The columnar guide surface 113b is formed into a column around a center axis passing though the intersection, that is, a center axis in parallel with the surface shown in FIG. 6. As shown in FIG. 6, the guide surfaces 113a and 113b are placed as double layers so as to overlap each other at a distance in the thickness direction of the device.

In order to adjust the position of the spindle motor 106 along the thickness direction of the device, that is, along a height direction Z, a height adjusting mechanism 114 is provided which can move the mechanical chassis 101 in the Z direction relative to the spindle motor 106 held by the external: adjusting device 100.

When the spindle motor 106 is attached to the mechanical chassis 101, as shown in FIG. 6, in a state in which the spindle motor 106 is held by the external adjusting device 100, the inclination and height of the two guide shafts 104 attached to the mechanical chassis 101 are measured by an external measuring machine such as a three-dimensional measuring machine (not shown) in the track width direction and the track tangent direction as shown in FIGS. 1 to 3. Hence, it is possible to measure displacement in inclination and height of the optical pickup 102, which records and reproduces a signal for a disc, in the track width direction and the track tangent direction relative to an ideally positioned disc. Additionally, it is possible to measure displacement in inclination and height of the objective lens 112 in the track width direction and the track tangent direction relative to an ideal optical axis and an ideal height.

Further, also by measuring a flat surface such as the lens frame 112a of the objective lens 112, it is possible to measure displacement in inclination and height of the objective lens 112 in the track width direction and the track tangent direction relative to the ideal optical axis and the ideal height.

Similarly, for a disc placing surface 107a on the turntable 107 of the spindle motor 106 shown in FIG. 6, inclination and a height in the track width direction and the track tangent direction are measured by the external measuring machine.

For the disc placing surface 107a of the spindle motor 106, inclination in the track width direction and the track tangent direction is adjusted by the inclination adjusting mechanism 113 based on the measurement results. Further, the height of the disc placing surface 107a is adjusted relative to the mechanical chassis 101 by the height adjusting mechanism 114.

Consequently, the inclination and height of the disc placing surface 107a in the track width direction and the track tangent direction can be adjusted in accordance with the inclination and height of the optical pickup 102 in the track width direction and the track tangent direction. In other words, adjustment is made in such a way that agreement is made between the optical axis of the objective lens 112 and the rotation axis of the spindle motor 106 and the focus of the objective lens 112 matches with the recording surface of the optical disc 103.

Figure 7:
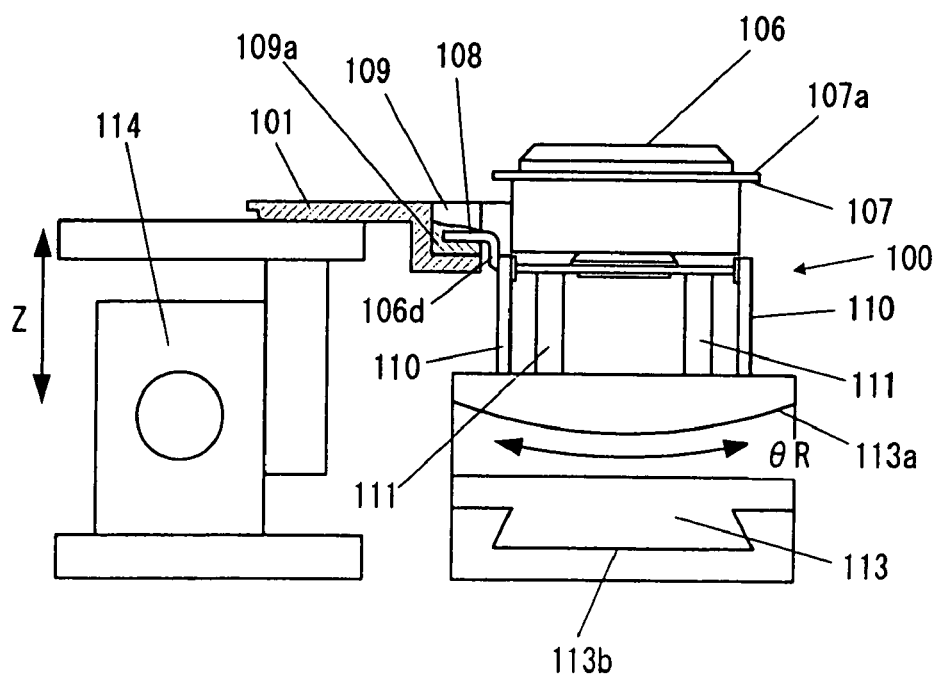
FIG. 7 is a view showing that assembling of the spindle motor is completed by using the assembling device of FIG. 6.

As shown in FIG. 7, the spindle motor 106 adjusted thus is fixed to the mechanical chassis 101 by adhesive, wax represented by solder, and bonding means 109a such as welding.

As described above, the present invention eliminates the need to provide a mechanism for adjusting the inclination or height of the spindle motor 106. Thus, it is possible to provide an inexpensive configuration of the recording and reproducing device for an optical disc and to reduce the thickness of the device.

The following will discuss a mechanism for adjusting the position of the spindle motor 106 in the surface direction of an optical disc, that is, in the XY direction of FIGS. 1 and 2.

Figure 8:
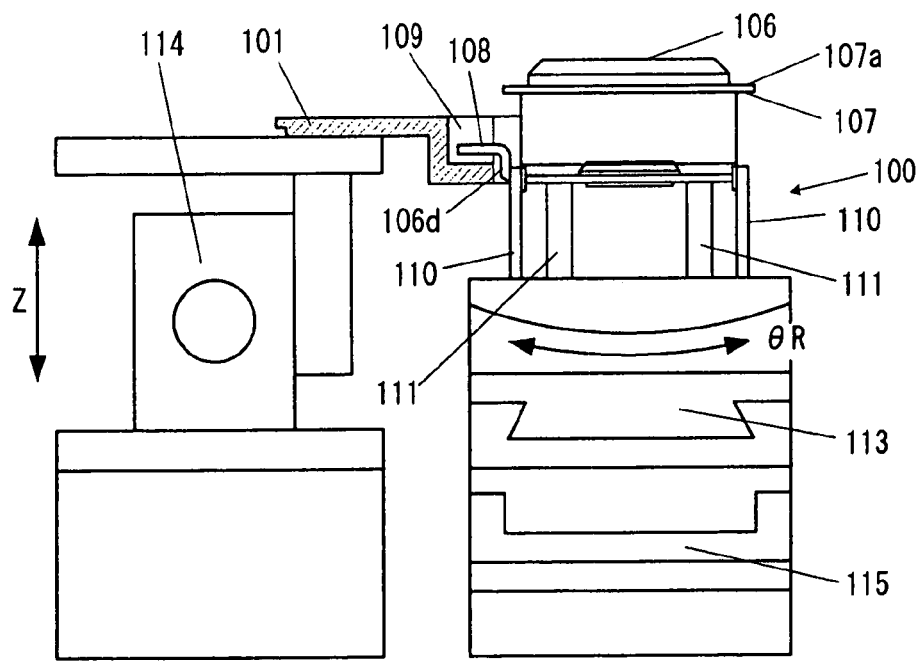
FIG. 8 is a view showing a main configuration of an assembling device according to another example of the present invention.
Figure 9:
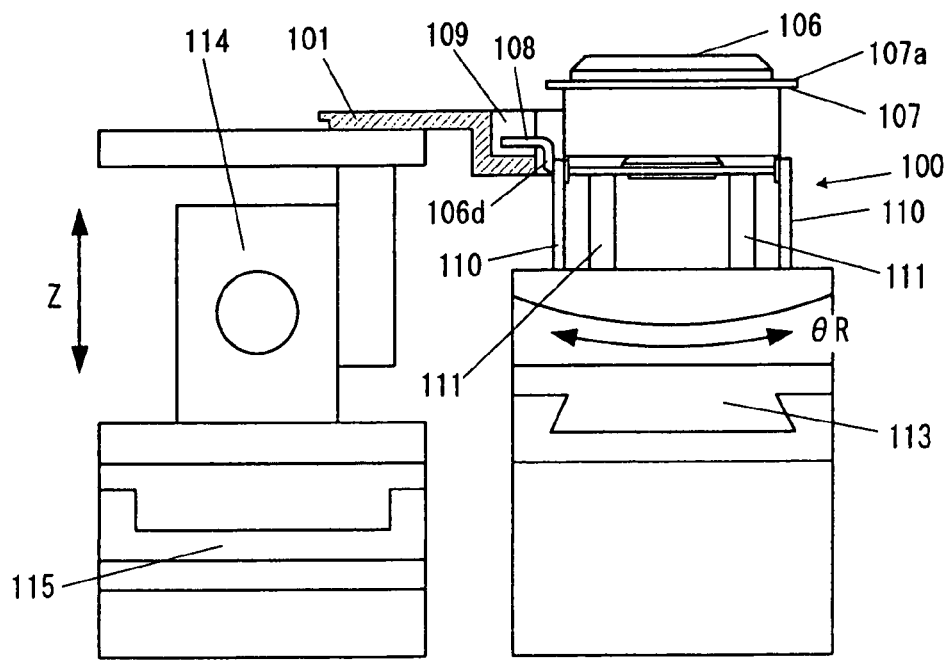
FIG. 9 is a view showing a variation of the assembling device shown in FIG. 8.

As shown in FIGS. 8 and 9, a center position adjusting mechanism 115 for making movement in the XY direction is provided for one of the inclination adjusting mechanism 113, which adjusts inclination of the disc placing surface 107a in the track width direction and the track tangent direction on the turntable 107 of the spindle motor 106, and the height adjusting mechanism 114 of the mechanical chassis 101. FIG. 8 shows an example in which the center position adjusting mechanism 115 is provided for the inclination adjusting mechanism 113, and FIG. 9 shows an example in which the center position adjusting mechanism 115 is provided for the height adjusting mechanism 114.

As described above, for the two guide shafts 104 provided in the mechanical chassis 101, the inclination and height in the track width direction and the track tangent direction are measured by the external measuring machine such as a three-dimensional measuring machine. Thus, it is possible to measure displacement in inclination and height of the optical pickup 102, which records and reproduces a signal for the optical disc 103, in the track width direction and the track tangent direction relative to an ideal disc. In addition, it is possible to measure the inclination and height of the objective lens 112 in the track width direction and the track tangent direction relative to the ideal optical axis and the ideal height.

Further, by measuring a flat surface and the like of the objective lens 112, it is possible to measure displacement in inclination and height of the objective lens 112 in the track width direction and the track tangent direction relative to the ideal optical axis and the ideal height.

Similarly in FIGS. 8 and 9, the inclination and height of the disc placing surface 107a of the spindle motor 106 are measured-in the track width direction and the track tangent direction and the rotation center position of the spindle motor 106 is measured by the external measuring machine.

Additionally, two or more arbitrary positions on the mechanical chassis 101 are measured by the external measuring machine. Hence, it is possible to determine an absolute center position for attaching the spindle motor 106 on the mechanical chassis 101.

For the disc placing surface 107a of the spindle motor 106, inclination in the track width direction and the track tangent direction is adjusted by the inclination adjusting mechanism 113 based on the measurement results. Further, the height of the disc placing surface 107a is adjusted by the height adjusting mechanism 114. Moreover, agreement is made between the center positions of the mechanical chassis 101 and the spindle motor 106 in the XY direction by the center position adjusting mechanism 115.

Consequently, it is possible to make adjustment in such a way that the inclination and height of the disc placing surface 107a in the track width direction and the track tangent direction relatively matches with the inclination and height of the optical pickup 102 in the track width direction and the track tangent direction. Further, agreement is made between the optical axis of the objective lens 112 and the rotation axis of the spindle motor 106, and adjustment can be made in such a way that the focus of the objective lens 112 matches with the recording surface of the optical disc 103. Moreover, it is possible to make agreement between the absolute attaching center of the spindle motor 106 in the mechanical chassis 101 and the rotation center of the spindle motor 106.

As with FIGS. 4 and 7, the spindle motor 106 adjusted thus is fixed to the mechanical chassis 101 by adhesive, wax, and the bonding means 109a such as welding.

As described above, the present invention makes it possible to precisely make agreement between the absolute attaching center of the spindle motor in the mechanical chassis 101 and the rotation center of the spindle motor 106. Hence, for example, in the case of an optical disc recording and reproducing device of magneto optic recording, it is to reduce the width of a magnetic head in the track tangent direction, achieving lower power consumption.

Figure 10:
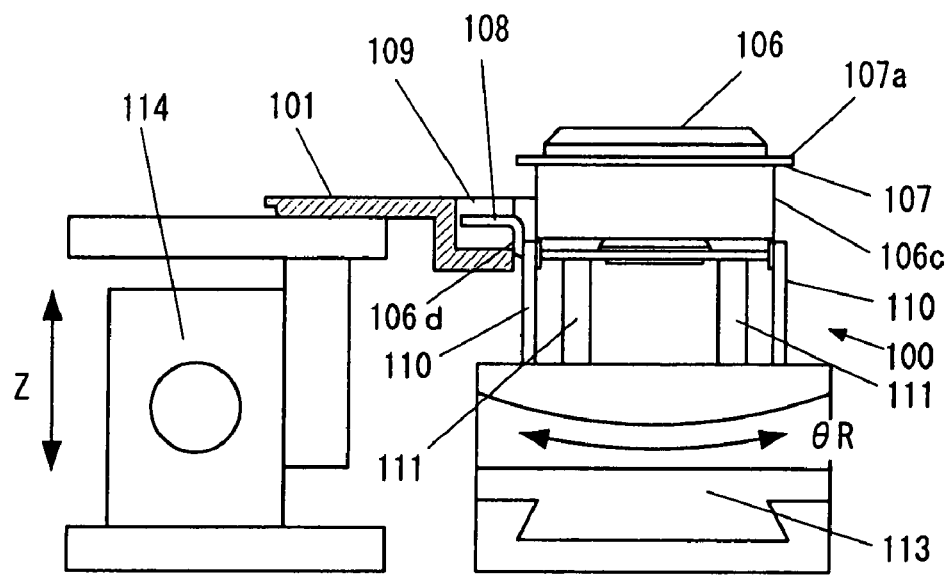
FIG. 10 is a view for explaining a function of guards according to the present invention.
Figure 11:
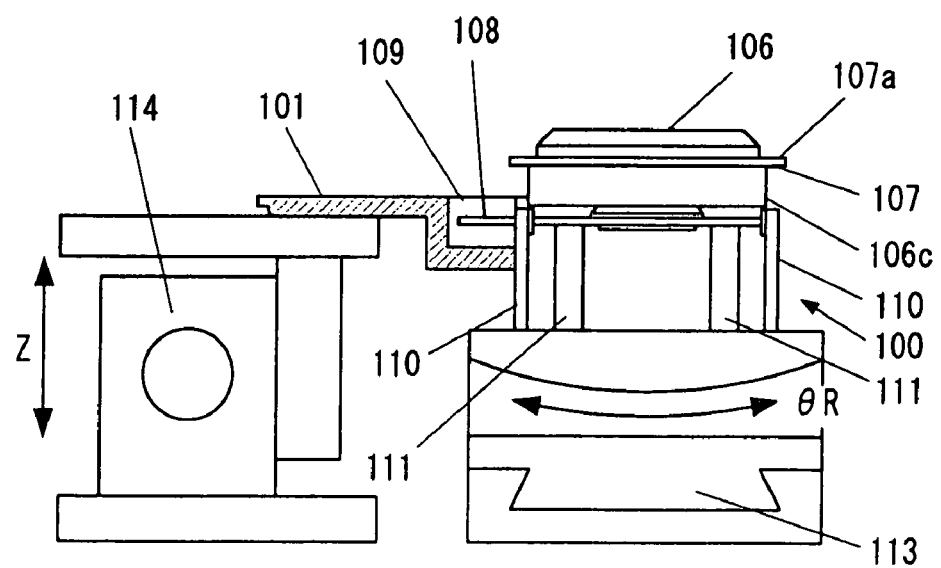
FIG. 11 is a view for explaining inconvenience when the guards are absent.
Figure 12:
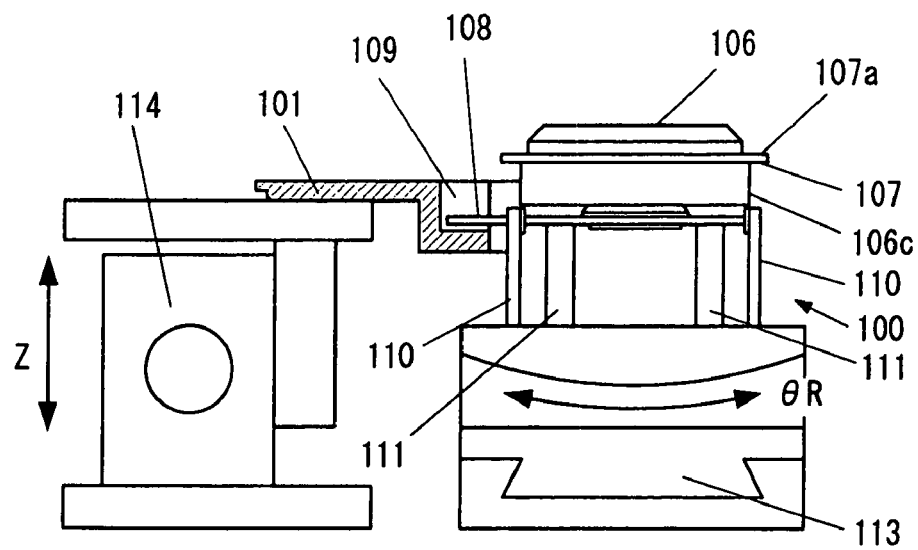
FIG. 12 is a view showing an example in which no inconvenience occurs even when the guards of FIG. 10 are absent.
Figure 13:
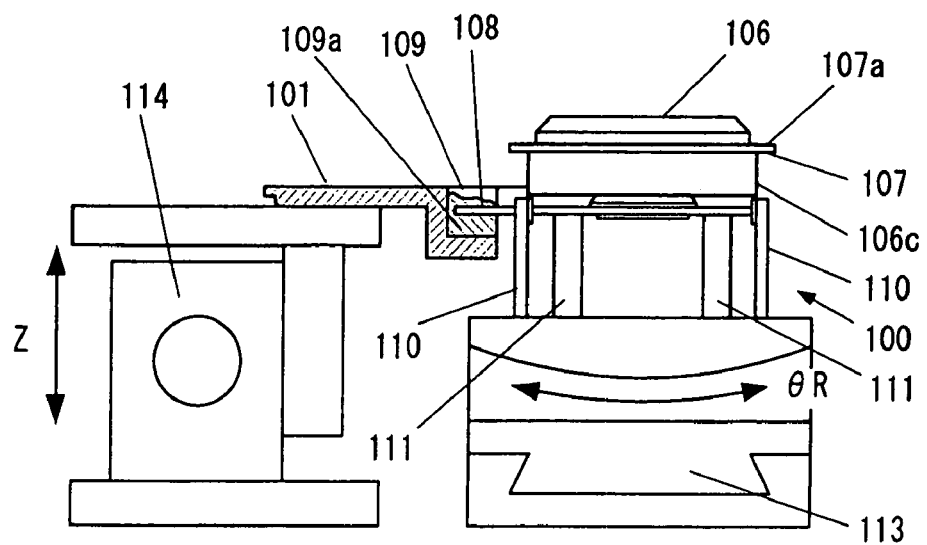
FIG. 13 is a view showing that assembling of the spindle motor of FIG. 12 is completed.

Referring to FIGS. 10 to 13, the following will discuss the guards 106d. formed integrally with the protrusions 108 of the spindle motor 106. As shown in FIG. 10, the guards 106d are formed in parallel with the shaft center of the motor 106 by bending the protrusions 108 as described above. Also, the guards 106d are placed at a distance in the diameter direction of the motor 106 from a rotor outer circumference 106c of the spindle motor 106, so that as described above, the guards 106d are positioned outside the chucking pins 110 along the diameter direction of the spindle motor 106 when the chucking pins 110 chuck the base 106a of the spindle motor 106. Meanwhile, for comparison, FIGS. 11 to 13 show that the protrusions 108 simply protrude from the motor base 106a of the spindle motor 106 in the diameter direction and the guards 106d are not provided.

Similarly, various measurements are made by the external measuring machine, the attitude and position of the spindle motor 106 are adjusted accordingly, and then, the spindle motor 106 is fixed to the mechanical chassis 101 by the bonding means 109a. However, satisfactory adjustment may not be performed due to excessive adjustment and so on. Such a defective adjustment occurs when the mechanical chassis 101, the spindle motor 106, and so on have a problem of processing accuracy and so on, adjustment considerably exceeding an assumed range is required, or a malfunction occurs during adjustment.

In the case of such a faulty adjustment, when the guards 106d are not provided, the chucking pins 110 may hit the mechanical chassis 101 as shown in FIG. 11.

In contrast to FIG. 11, when the guards 106d are provided as shown in FIG. 10, the guards 106d hit the mechanical chassis 101 prior to the chucking pins 110 for fixing the spindle motor 106. As a result, it is possible to prevent damages on the chucking pins 110, thereby eliminating the need for time and cost for reassembling a damaged adjusting device.

Certainly, when there is little likelihood that the chucking pins 110 may hit the mechanical chassis 101, as shown in FIGS. 12 and 13, the protrusions 108 simply protrude in the diameter direction from the motor base 106a of the spindle motor 106. Thus, sufficient functions can be achieved without the guards 106d.

FIG. 12 shows a state in which the protrusions 108 of the spindle motor 106 are freely fit into the recessed steps 109 of the mechanical chassis 101 without allowing the chucking pins 110 to hit the mechanical chassis 101. FIG. 13 shows a state in which various measurements are performed by the external measuring machine thereafter, the attitude and position of the spindle motor 106 are adjusted accordingly, and the spindle motor 106 is fixed to the mechanical chassis 101 by the bonding means 109a.

The invention claimed is:

1. An assembly device for assembling a recording and reproducing device for an optical disc, such recording and reproducing device comprising a spindle motor for rotating an optical disc in a substantially horizontal plane, a motor base, a plurality of protrusions extending radially from the motor base, a mechanical chassis having a plurality of recessed steps for receiving the respective plurality of protrusions, and bonding means for bonding the plurality of protrusions to the respective plurality of recessed steps, the assembly device comprising:
   a first inclination adjusting mechanism for adjusting inclination of the spindle motor in a first direction about a first axis,
   a second inclination adjusting mechanism for adjusting inclination of the spindle motor in a second direction about a second axis perpendicular to the first axis, and
   a height adjusting mechanism for adjusting a height of the spindle motor relative to the optical pickup,
   wherein the first inclination adjusting mechanism and the second inclination adjusting mechanism each comprise a columnar guide surface having a curved surface that is curved about the first axis and second axis, respectively.

2. The assembly device according to claim 1, further comprising center position adjusting mechanism for adjusting a position of the spindle motor in a horizontal direction without adjusting an inclination of the spindle motor.

3. The assembly device according to claim 2, wherein the center position adjusting mechanism comprises at least a first flat, horizontal surface for sliding against a second flat, horizontal surface, and
   the first inclination adjusting mechanism, the second inclination adjusting mechanism, and the center position adjusting mechanism are all part of a single external adjusting device.

4. The assembly device according to claim 2, wherein the first inclination adjusting mechanism, the second inclination adjusting mechanism, and the center position adjusting mechanism are all part of a single external adjusting device, and
   the height adjusting mechanism is part of a separate external adjusting device.

5. The assembly device according to claim 1, further comprising:
   height determining pins on an uppermost one of said first and second inclination adjusting mechanisms, said height determining pins for supporting a bottom surface of such motor base; and
   chucking pins on said uppermost one of said first and second inclination adjusting mechanisms, said chucking pins for securing an outer peripheral surface of such motor base.

* * * * *